April 7, 1942.  F. G. DOUGLASS  2,278,839
ROTOR FOR VIBRATORS
Filed March 29, 1941
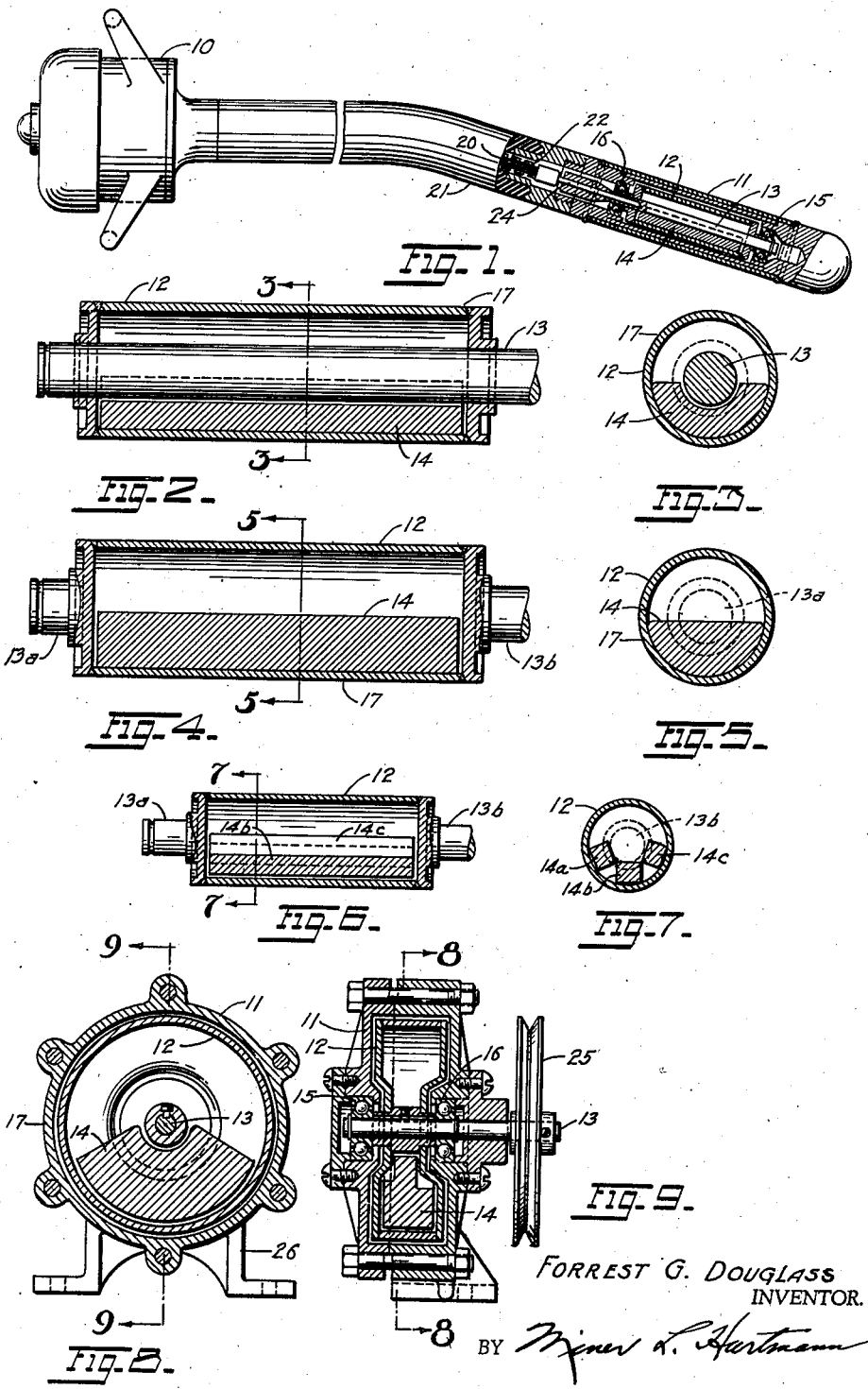
FORREST G. DOUGLASS
INVENTOR.
BY *Miner L. Hartmann*
ATTORNEY.

Patented Apr. 7, 1942

2,278,839

UNITED STATES PATENT OFFICE 2,278,839

ROTOR FOR VIBRATORS

Forrest G. Douglass, Los Angeles, Calif., assignor to Viber Company, a corporation of California Application March 29, 1941, Serial No. 385,962

14 Claims. (Cl. 259—1)

This invention relates to vibrating mechanisms and in particular to a mechanism having an eccentrically weighted rotor.

My invention is particularly adapted for compacting granular masses such as concrete, but it may also be used for vibrating screens, conveyors and the like. One object of my invention is to provide a rotary vibratory mechanism which produces high frequency radial vibrations. Another object is to provide an eccentrically weighted rotor for a vibratory machine which greatly decreases the starting torque on the driving shaft. Still another object is to provide a rotary vibratory mechanism in which the life of the bearings is greatly increased. These and other objects will be apparent from the description and drawing in which:

Fig. 1 is a side elevation, partly in section, showing one form of my improved vibrating mechanism;

Fig. 2 is a side elevation, partly in section, of one form of rotor according to my invention;

Fig. 3 is a cross-sectional view of Fig. 2, taken on the line 3—3 of Fig. 2;

Fig. 4 shows in elevation, partly in section another form of rotor after my invention;

Fig. 5 is a cross-sectional view of the device shown in Fig. 4, taken on the line 5—5;

Fig. 6 shows in elevation and section still another form of rotor after my invention;

Fig. 7 is a cross-sectional view of Fig. 6, taken on the line 7—7;

Fig. 8 is a cross-sectional view of another form of vibrator after my invention, taken on the line 8—8 of Fig. 9;

Fig. 9 is an elevation, partly in section on the line 9—9 of Fig. 8.

In general, my vibrator consists of a housing 11, within which is an eccentrically weighted rotor 12 whose shaft 13 is rotatably mounted in the ball bearings 15 and 16, which are supported by the housing 11. The rotor consists of a rotor casing 17 and a weight member 14 unattached to either the shaft or to the rotor casing, this weight being adapted to eccentrically load the rotor 12 when it is operated at high speed. The vibrations produced by the rotation of the eccentrically weighted rotor are transmitted to the housing through the bearings 15 and 16, and from the housing to the object or to the mass to be vibrated.

The preferred form of my vibrator is shown in Figs. 1, 2 and 3. This vibrator is especially adapted for partial insertion within a mass of concrete, for the purpose of vibrating and compacting the same by contact through the outer housing 11. A motor 10 drives a flexible drive shaft 20 incased within a flexible sheathing 21, the coiled metallic ribbon 22 serving as a loose bearing surface for the flexible drive shaft, which is commonly a woven or braided wire cable. The flexible drive shaft 20 is connected to the rotor 12 by means of a key coupling 24, the rotor shaft 13 being mounted in ball bearings 15 and 16. The rotor is shown in detail in Figs. 2 and 3. Within the cylindrical rotor casing 17, rigidly attached as by welding to the rotor shaft 13, is a weight member 14 which is not attached to the shaft nor to the rotor casing. As shown in Fig. 3, the weight fills approximately one-half the annular space between the shaft and the rotor casing 17, but weights of other shapes may be employed, for example as shown in Figs. 4 to 8.

In the rotor shown in Figs. 4 and 5, the stub-shafts 13a and 13b are fastened to the ends of the rotor casing 17, and the weight member 14, as shown is approximately one half of the cylindrical space within the casing 17. In Figs. 6 and 7, the weight is represented as several bars, 14a, 14b, 14c. The weights may obviously be of any size or shape adapted to fit within the casing and to provide eccentric loading of the rotor casing when the rotor is revolved at high speeds.

In Figs. 8 and 9 is shown another form of vibrator which is adapted for attachment to a platform, wall form, sieve frame or the like, by its base 26 which is integral with the casing 11, and is provided on an extension of the rotor shaft 13, with a pulley 25 for a belt drive from a motor (not shown). As in the preferred type, the weight 14 is unattached to either the shaft or to the rotor casing.

The operation of my vibrator device will be apparent. When the rotor casing 17 is revolved at speeds suitable to produce vibration, the loose weight member 14 (or members if more than one is used) is thrown outwardly by centrifugal force into surface contact with the rotor casing 17 and is held in place by that force so long as sufficient speed is maintained; in effect it becomes a part of the rotor, with its center of mass at the maximum distance from the axis of rotation, within the limits defined by the inside wall of the rotor casing.

The weight members may be of any suitable composition, but obviously for effective vibration, they should be of material of high specific gravity such as metals and alloys.

The advantages of providing a loose eccentric weight in high-speed vibration equipment are important. The problem of suitable ball bearings for service in this type vibrator in which the weight is fixed to the shaft has heretofore never been solved, and short life of bearings, and frequent replacements, have been tolerated for lack of a solution of the problem.

The ball bearings holding an eccentrically weighted rotor of the type having the eccentric weight fixed relative to the shaft, when operated at high speed, fail because that portion of the inside race of the bearing disposed in the same angular position on the shaft as is the weight, first becomes slightly enlarged and the surface becomes roughened, seemingly due to the greater contact pressure in that zone due to the uneven loading. When the ball race becomes even slightly roughened, the defects become rapidly worse with longer operation; small flakes of metal separate and cause roughness on the balls, and soon the bearing runs hot and finally becomes useless. The average life of bearings in one commercially produced vibrator having the eccentric weight fixed to the shaft is from 100 to 200 hours. By the use of the loose weight rotor of my invention, this life is extended to four or five times that average present life.

In my invention, where the weight member is not fixed relative to the angular position of the shaft, the eccentric loading may be at random angular position of the shaft, and hence the excessive load and wear on the bearings is not always at one position. Every time the rotor with my loose weight is stopped and started, the weight takes a new and random position in angular relation to the shaft and its bearings. This increase in the bearing life is quite important from a practical stand-point, because of the operating time saved, since bearing replacements are much less frequent.

Another important advantage of my invention is the decrease in the starting torque of the rotary system of a vibrator due to the initial slippage of the eccentric weight in the rotor casing. This slippage occurs whenever the speed is so low that the centrifugal force does not keep the weight pressed tightly against the rotor casing. Slippage occurs both on starting and on stopping the vibrator. In starting from zero speed, the motor is required to overcome friction load only, and the additional load due to the revolving of an eccentric weight in the rotor is not imposed until a considerable speed has been attained. This relieves the motor of excessive starting overload which results when the weighted eccentric is rigidly attached to the shaft, and must be set into motion from the start.

Where my loose weight rotor is used in connection with a long flexible drive shaft within a flexible housing, as in Fig. 1, the decrease in the starting torque is important because there is much less danger of putting a permanent spiral "kink" in the long flexible drive shaft or cable, which is commonly made up of twisted or braided fine wires. It has been observed that where this permanent kink has once been produced in the flexible cable by temporary overloading such as occurs in starting with a fixed weight rotor, that the cable thereafter rubs in localized positions on the flexible conduit and particularly on the spiral ribbon therein which serves as a bearing surface for the cable. This unequal rubbing eventually wears the outer strands of the flexible drive shaft, until they are severed, and the drive shaft becomes useless. This kinking and resultant uneven wear does not occur to any considerable extent when the weight is not fastened to the shaft and the eccentric load is picked up gradually after the moving parts, including the cable itself, have attained some appreciable speed. As these flexible drive shafts and flexible casings are expensive items, it will be clear that added length of service is important in the practical use of vibrators.

The casing for the rotor may be advantageously tightly closed to exclude oil and grease. It has been found that where the eccentric weight acts as a beater that an air-oil emulsion of sufficiently high viscosity to effect the action of the vibrator may be produced at the very high speeds at which these devices are operated. While my device will vibrate to some extent even if there is only a small coefficient of friction between the surface of the weight member and the inside of the rotor casing, I prefer that the coefficient of friction between the contacting surfaces be sufficiently high so that at operating speeds there is little or no slippage between them. As an illustration, I have found that the surface of commercial steel tubing and an ordinary cast lead weight offer sufficient resistance to perform perfectly in the manner described above.

While I have described certain preferred embodiments of my invention, I do not wish to be limited to these particular forms, but restrict my invention only insofar as is necessitated by the prior art and by the spirit of the appended claims.

I claim:

1. A rotor for an eccentric weight vibrator comprising a rotatable casing, and a loose weight within said casing adapted to frictionally engage the inside of said casing when held against it by the centrifugal force developed during high speed rotation of said rotor, the center of gravity of said weight when frictionally held to the casing being outside the axis of rotation of said casing.

2. A rotor for an eccentric weight vibrator comprising a rotatable casing, and a loose weight within said casing adapted to frictionally engage the inside of said casing when held against it by the centrifugal force developed during high speed rotation of the rotor, said weight when in position in contact with the inner wall of said rotatable casing dynamically unbalancing said rotor.

3. A rotor for an eccentric weight vibrator comprising a shaft, a rotatable casing attached to said shaft, and a loose weight within said casing adapted during high-speed rotation of the rotor to frictionally engage the inner wall of said casing whereby to dynamically unbalance said rotor.

4. A rotor for an eccentric weight vibrator comprising a casing mounted for rotation, and a loose weight within said casing adapted to frictionally attach itself during high-speed rotation of the rotor to the inner wall of said casing whereby to dynamically unbalance the rotor.

5. A rotor for an eccentric weight vibrator comprising a hollow cylindrical casing provided with spindles for rotation about an axis, and an unattached unbalancing weight within said casing, said weight being adapted to frictionally engage the inner wall of said casing when the rotor is revolved at high speed.

6. A rotor for an eccentric weight vibrator comprising a shaft, a cylindrical casing concentrically attached on said shaft, and an unattached unbalancing weight within said casing, said weight being adapted to frictionally engage the inner wall of said casing when the rotor is revolved at high speed.

7. An eccentric weight vibrator including a housing, and an eccentrically weighted rotor for rotation within the housing, said rotor comprising a casing, shaft means attached to the casing, and an unattached unbalancing weight member within the casing.

8. An eccentric weight vibrator including a housing and an eccentrically weighted rotor for rotation within the housing, said rotor comprising a casing, shaft means attached to the casing, and an unattached weight member within the casing adapted upon high-speed rotation of the casing to position itself against the inner wall of the casing to effect eccentric loading of the rotor relative to the axis of rotation on said shaft means.

9. An eccentric weight vibrator including a housing, means for attachment of the housing to an object to be vibrated, and an unbalanced rotor within the housing, said rotor comprising a rotatable short cylindrical casing, shaft means attached to the casing, and an unattached weight member within the casing adapted upon high-speed rotation of the casing to position itself against the inner wall of the casing to effect eccentric loading of the rotor relative to the axis of rotation on said shaft means.

10. An insertible vibrator for compacting concrete comprising a tubular housing adapted to be immersed at least partly in the concrete, and a rotor adapted for rotation within said housing, said rotor including a hollow elongated casing, shaft means for rotation of said casing on an axis disposed in the longitudinal direction, and an unattached elongated weight within said casing adapted to produce eccentric loading of the rotor during high-speed rotation.

11. An insertible vibrator for compacting concrete comprising a motor means; a tubular housing adapted to be immersed at least partly in the concrete; and a rotor adapted for rotation within said housing, said rotor including a hollow elongated casing, shaft means for rotation of said casing on an axis disposed in the longitudinal direction, and an unattached unbalancing weight within said casing; and a flexible drive shaft enclosed within a flexible conduit operatively connected between said motor means and said rotor.

12. An insertible vibrator for compacting concrete comprising a motor means; a tubular housing adapted to be immersed at least partly in the concrete; an elongated hollow casing adapted for rotation within said housing; shaft means for rotation of said casing on an axis disposed in the longitudinal direction, bearing means for said shaft means mounted in said housing; a flexible drive shaft enclosed within a flexible conduit operatively connected between said motor means and said casing shaft means; and an unattached elongated weight within said casing adapted to produce eccentric loading of the rotor during high-speed rotation.

13. A vibrator for compacting concrete comprising a motor means; a housing; and a rotor adapted for rotation within said housing, said rotor including a hollow casing, shaft means for rotation of said casing on an axis disposed in the longitudinal direction, and an unattached unbalancing weight within said casing; and a flexible drive shaft within a flexible conduit operatively connected between said motor means and said shaft means.

14. A rotor for an eccentric weight vibrator comprising a shaft, a hollow cylindrical casing concentrically attached on said shaft, and an unattached unbalancing weight within said casing, said weight being in the shape of a segment of an annulus fitting loosely between the shaft and the inner wall of said casing.

15. A rotor for an eccentric weight vibrator comprising a hollow cylindrical casing provided with spindles for rotation about the cylinder axis, and an unattached unbalancing weight within said casing, said weight being in the shape of a segment of a cylinder loosely fitting within said casing.

FORREST G. DOUGLASS.